US012602953B2

(12) United States Patent
Hsing et al.

(10) Patent No.: US 12,602,953 B2
(45) Date of Patent: Apr. 14, 2026

(54) GESTURE RECOGNITION METHOD

(71) Applicant: Compal Electronics, Inc., Taipei City (TW)

(72) Inventors: Wei-De Hsing, Taipei City (TW); Chia-Nan Pan, Taipei City (TW); Guan-Yu Chen, Taipei City (TW)

(73) Assignee: Compal Electronics, Inc., Taipei City (TW)

( * ) Notice: Subject to any disclaimer, the term of this patent is extended or adjusted under 35 U.S.C. 154(b) by 264 days.

(21) Appl. No.: 18/380,128

(22) Filed: Oct. 13, 2023

(65) Prior Publication Data
US 2025/0078573 A1 Mar. 6, 2025

(30) Foreign Application Priority Data

Sep. 5, 2023 (TW) .................................. 112133715

(51) Int. Cl.
| | |
|---|---|
| *G06K 9/00* | (2022.01) |
| *G06T 7/20* | (2017.01) |
| *G06T 7/70* | (2017.01) |
| *G06V 40/20* | (2022.01) |

(52) U.S. Cl.
CPC ................ *G06V 40/28* (2022.01); *G06T 7/20* (2013.01); *G06T 7/70* (2017.01); *G06T 2207/30196* (2013.01)

(58) Field of Classification Search
CPC ......... G06T 7/20; G06F 3/017; G06V 40/113; G06V 40/28
See application file for complete search history.

(56) References Cited

U.S. PATENT DOCUMENTS

| | | | | |
|---|---|---|---|---|
| 9,785,247 | B1 * | 10/2017 | Horowitz ............. | G06V 40/113 |
| 2005/0271279 | A1 | 12/2005 | Fujimura et al. | |
| 2011/0175802 | A1 | 7/2011 | Hsieh et al. | |

(Continued)

FOREIGN PATENT DOCUMENTS

| | | |
|---|---|---|
| CN | 110333772 A | 10/2019 |
| CN | 110569817 B | 11/2021 |

(Continued)

*Primary Examiner* — Hadi Akhavannik

(74) *Attorney, Agent, or Firm* — KIRTON McCONKIE; Evan R. Witt

(57) ABSTRACT

A gesture recognition method includes steps of (S1) capturing a current image; (S2) determining whether the image includes a hand image; (S3) when a determination result of step S2 is satisfied, determining whether the hand image is a valid gesture; (S4) when a determination result of step S3 is satisfied, the gesture recognition unit records multiple coordinate information and time information of multiple locations corresponding to multiple fingers in a finger list, and storing the finger list in the storage unit; (S5) the gesture recognition unit obtaining an orientation of the palm; (S6) the gesture recognition unit calculating a width of the palm and a dynamic displacement threshold; (S7) the gesture recognition unit determining whether to launch an action command according to the orientation of the palm, the dynamic displacement threshold, and a determination condition; (S8) when the determination result of step S7 is satisfied, launching the action command.

9 Claims, 6 Drawing Sheets

(56)                   References Cited

U.S. PATENT DOCUMENTS

| | | | | |
|---|---|---|---|---|
| 2011/0222726 A1* | 9/2011 | Ruan | ...................... | G06V 40/28 |
| | | | | 382/103 |
| 2014/0198031 A1* | 7/2014 | Xiong | .................. | G06V 40/113 |
| | | | | 382/103 |
| 2017/0270289 A1* | 9/2017 | Lymberopoulos | ..... | G06V 40/70 |
| 2018/0032144 A1* | 2/2018 | Horowitz | .................. | G06T 7/20 |
| 2019/0033975 A1* | 1/2019 | Horowitz | ................ | G06F 3/011 |
| 2019/0392205 A1* | 12/2019 | Tang | ................... | G05D 1/2285 |
| 2021/0174519 A1* | 6/2021 | Bazarevsky | .............. | G06T 7/75 |
| 2023/0205321 A1* | 6/2023 | Horowitz | ................ | G06T 7/251 |
| | | | | 345/156 |
| 2023/0214458 A1* | 7/2023 | Marsden | ................ | G06V 40/28 |
| | | | | 382/157 |
| 2023/0244316 A1* | 8/2023 | Schwarz | .................. | G06N 3/08 |
| | | | | 345/156 |

FOREIGN PATENT DOCUMENTS

| | | | |
|---|---|---|---|
| CN | 114463833 A | 5/2022 | |
| CN | 114792443 A | 7/2022 | |
| CN | 113221729 B | 9/2022 | |
| TW | 201120681 A | 6/2011 | |
| TW | 201342138 A | 10/2013 | |
| TW | I454966 B | 10/2014 | |
| TW | I479430 B | 4/2015 | |
| TW | I543017 B | 7/2016 | |
| TW | I634487 B | 9/2018 | |
| TW | I797635 B | 4/2023 | |

* cited by examiner

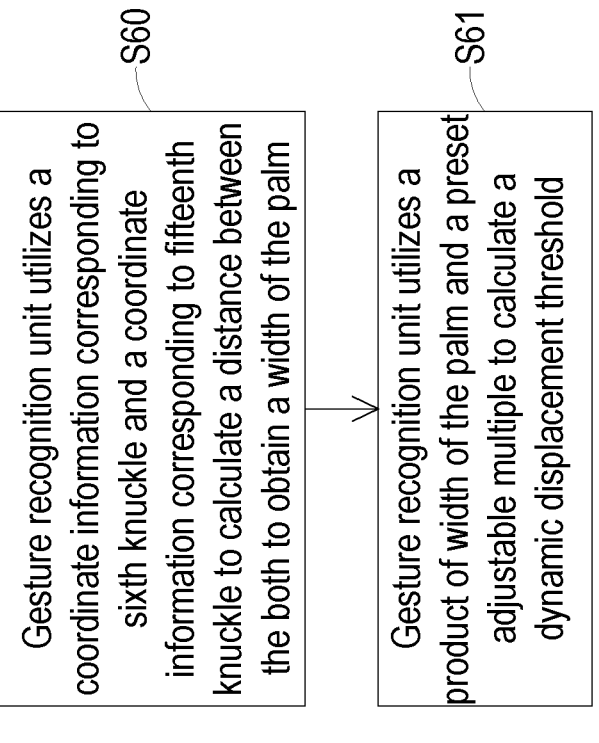

Gesture recognition unit utilizes a coordinate information corresponding to sixth knuckle and a coordinate information corresponding to fifteenth knuckle to calculate a distance between the both to obtain a width of the palm — S60

Gesture recognition unit utilizes a product of width of the palm and a preset adjustable multiple to calculate a dynamic displacement threshold — S61

FIG. 4

GESTURE RECOGNITION METHOD

CROSS-REFERENCE TO RELATED APPLICATION

This application claims priority to Taiwan Patent Application No. 112133715, filed on Sep. 5, 2023, which is incorporated herein by reference for all purposes.

FIELD OF THE INVENTION

The present disclosure relates to a technology field of gesture recognition, and more particularly to a gesture recognition method.

BACKGROUND OF THE INVENTION

A mobile device is usually controlled through touching a touch panel by hand or performing a voice control. Except the above-mentioned methods, more and more functions of the mobile device are performed through gesture motion to control the mobile device. Accordingly, a user uses the mobile device more conveniently.

The conventional mobile device adopts a fixed gesture displacement threshold to recognize the gesture. However, the deviation amount of the gesture is changed depending on the distance between a user and a camera of the mobile device. For the users at different distances from the camera of the mobile device, the same gesture between different users may obtain different deviation amounts, which can not correspond to the gesture displacement threshold. Consequently, the gesture recognition of the mobile device is not precise. In addition, misjudgment of the gesture may occur in the conventional mobile device. For example, when the user slides the palm to the right, the palm may shift to the left after returning to the initial position. Consequently, the mobile device misjudges that the user has performed a left swipe gesture. Moreover, when the palm of the user moves out from a visual range of the camera of the mobile device, the mobile device no longer processes the trajectory information of the previous gesture, i.e., ignores the trajectory of the previous movement of the palm. Consequently, the user's gestures may be ignored, which results in failing to control the mobile device accurately.

Therefore, it is desired to develop a gesture recognition method for the mobile device to address the issues encountered by the prior arts.

SUMMARY OF THE INVENTION

An object of the present disclosure is to provide a gesture recognition method in order to address the issues of inaccurately recognizing the gesture, misjudging the gesture and failing to control the mobile device because of the palm moving out from the visual range of the camera of the conventional mobile device.

In accordance with one aspect of the present disclosure, a gesture recognition method for a mobile device is provided. The mobile device includes an image capture unit, a gesture recognition unit, and a storage device. The gesture recognition method includes steps of: (S1) capturing an image frame within a current visual range by the image capture unit; (S2) determining whether the image frame captured by the image capture unit includes a hand image of a palm by the gesture recognition unit; (S3) when a determination result of the step (S2) is satisfied, the gesture recognition unit determining whether the hand image is a valid gesture;

(S4) when a determination result of the step (S3) is satisfied, the gesture recognition unit recording a plurality of coordinate information of a plurality of locations corresponding to a plurality of fingers of the palm shown in the hand image in a finger list, and storing the finger list in the storage unit; (S5) the gesture recognition unit obtaining an orientation of the palm according to the hand image; (S6) the gesture recognition unit calculating a width of the palm according to the hand image, and calculating a dynamic displacement threshold according to the width of the palm; (S7) the gesture recognition unit determining whether to launch an action command according to the dynamic displacement threshold and at least one determination condition, and when a determination result of the step (S7) is not satisfied, re-executing the step (S1); (S8) when the determination result of the step (S7) is satisfied, launching the action command, and re-executing the step (S1); and (S9) when the determination result of the step (S2) is not satisfied or when the determination result of the step (S3) is not satisfied, determining whether the record of the plurality of coordinate information in the finger list is empty, and re-executing the step (S1) when a determination result of the step (S9) is satisfied, and executing the step (S7) when the determination result of the step (S9) is not satisfied.

BRIEF DESCRIPTION OF THE DRAWINGS

FIG. 4 is a flowchart illustrating sub-steps of the step S6 shown in FIG. 1.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to limit the present disclosure.

Figure 1:
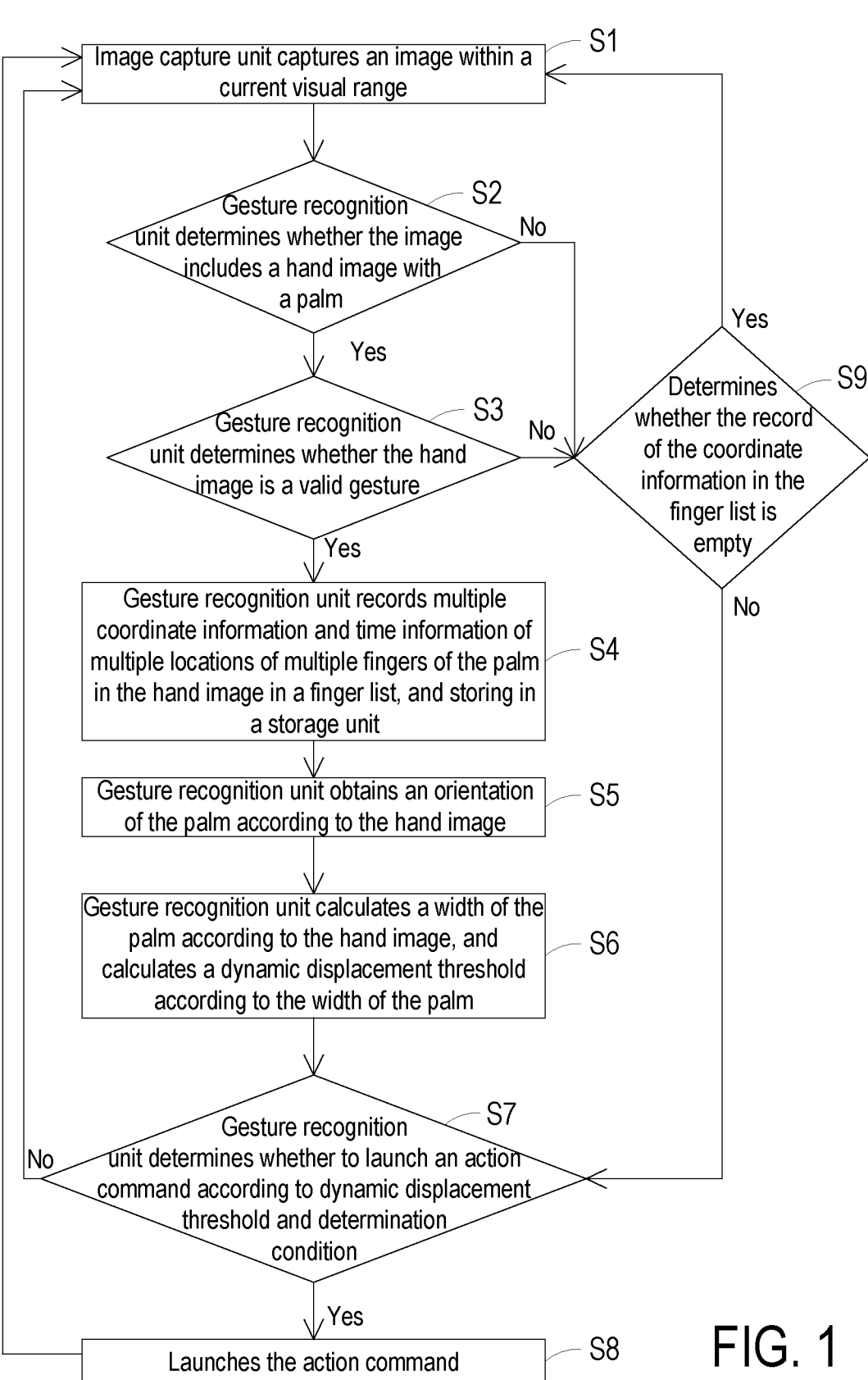
FIG. 1 is a flowchart illustrating a gesture recognition method according to an embodiment of the present disclosure.
Figure 2:
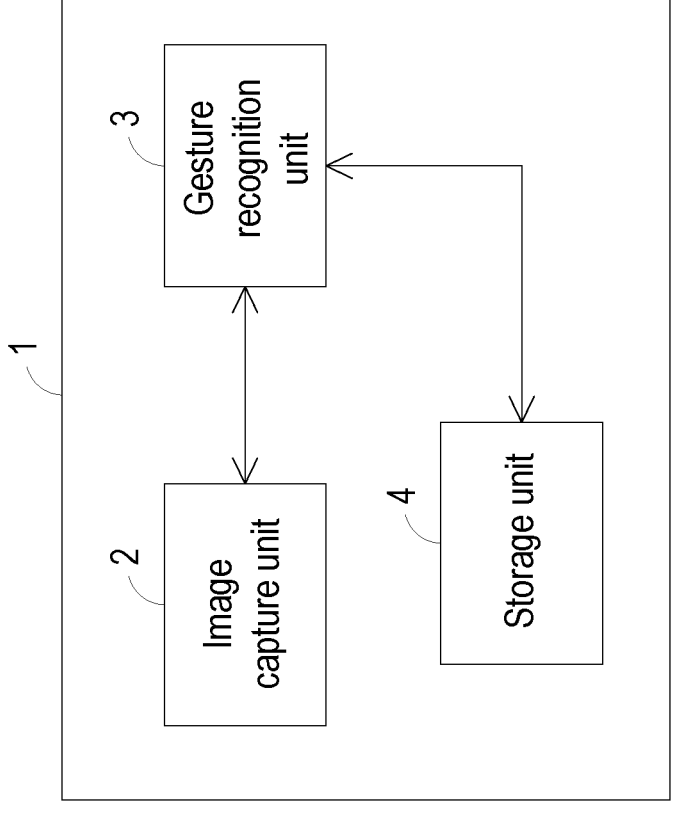
FIG. 2 is a schematic structure diagram illustrating a mobile device performing the gesture recognition method of the present disclosure.

FIG. 1 is a flowchart illustrating a gesture recognition method according to an embodiment of the present disclosure, and FIG. 2 is a schematic structure diagram illustrating a mobile device performing the gesture recognition method of the present disclosure. As shown in FIG. 1 and FIG. 2, the gesture recognition method of the present disclosure is applied in the mobile device 1 shown in FIG. 2. Preferably but not exclusively, the mobile device 1 is but not limited to a cell phone or a tablet. The mobile device 1 includes an image capture unit 2, a gesture recognition unit 3 and a storage unit 4. The image capture unit 2 is but not limited to a camera for capturing at least one image frame within a current visual range. The gesture recognition unit 3 is in communication with the image capture unit 2 and configured to identify a hand image of a palm of a user captured by the image capture unit 2. In some embodiments, the gesture recognition unit 3 obtains a plurality of location coordinates of each finger of the palm by using Mediapipe library. The storage unit 4 is but not limited to a memory and is in communication with the gesture recognition unit 3 for providing a data storage function.

The gesture recognition method of the present disclosure includes the following steps.

Step S1: an image frame is captured within a current visual range by the image capture unit 2.

Step S2: the gesture recognition unit 3 determines whether the image frame captured by the image capture unit 2 includes a hand image of a palm.

Step S3: when the determination result of the step S2 is satisfied, the gesture recognition unit 3 determines whether the hand image is a valid gesture.

Step S4: when the determination result of the step S3 is satisfied, the gesture recognition unit 3 records a plurality of coordinate information and time information of a plurality of locations corresponding to a plurality of fingers of the palm shown in the hand image in a finger list, and stores the finger list in the storage unit 4. In some embodiments, each coordinate information includes a three-dimensional coordinate information including X-axis coordinate information, Y-axis coordinate information, and Z-axis coordinate information. Each time information includes a timestamp.

Step S5: the gesture recognition unit 3 obtains an orientation of the palm according to the hand image.

Step S6: the gesture recognition unit 3 calculates a width of the palm according to the hand image, and calculates a dynamic displacement threshold according to the width of the palm. A distance between the user and the image capture unit 2 of the mobile device 1 is not fixed, and sizes of the palms of different users are also different. Consequently, through the step S6, the dynamic displacement threshold is dynamically calculated according to the distance between the user and the image capture unit 2 of the mobile device 1 (when the distance is farther, the width of the palm is smaller; on the contrary, when the distance is closer, the width of the palm is larger) and the size of the palm. In some embodiments, when the width of the palm is larger, the dynamic displacement threshold is larger. On the contrary, when the width of the palm is smaller, the dynamic displacement threshold is smaller.

Step S7: the gesture recognition unit 3 determines whether to launch an action command according to the orientation of the palm, the dynamic displacement threshold and the determination conditions. When a determination result is not satisfied, re-executing the step S1. In some embodiments, when the action command is launched, the application program in the mobile device 1 is enabled to operate.

Step S8: when the determination result of the step S7 is satisfied, the action command is launched.

Step S9: when the determination result of the step S2 is not satisfied or when the determination result of the step S3 is not satisfied, determines whether the record of the plurality of coordinate information in the finger list is empty, and re-executing the step S1 when the determination result is satisfied, and executing the step S7 when the determination result is not satisfied.

From above illustration, after the gesture recognition method of the present disclosure is performed, the orientation of the palm of the hand is determined, and the dynamic displacement threshold is calculated according to the width of the palm. Furthermore, whether to launch an action command is determined according to the orientation of the palm, the dynamic displacement threshold and the determination conditions. Consequently, the gesture recognition of the mobile device is more accurate.

Figure 3:
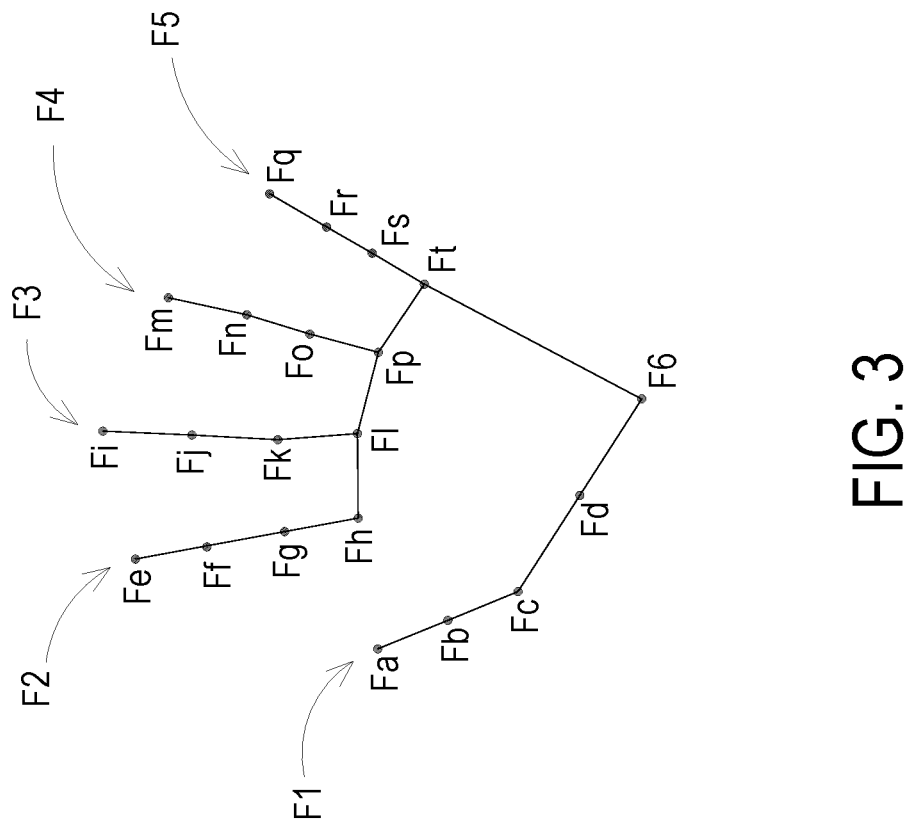
FIG. 3 is a schematic diagram illustrating a plurality of location coordinates of each finger of a palm captured by the mobile device of FIG. 2.

Please refer to FIG. 3, which is a schematic diagram illustrating a plurality of location coordinates of each finger of a palm captured by the mobile device of FIG. 2. In some embodiments, the gesture recognition unit 3 recognizes a thumb F1, an index finger F2, a middle finger F3, a ring finger F4, a little finger F5, and a wrist end F6 of the palm. The thumb F1, the thumb F1, the index finger F2, the middle finger F3, the ring finger F4 and the little finger F5 include a plurality of locations, respectively, distinguished by the gesture recognition unit 3. The plurality of locations of the thumb F1, from top to bottom, include a first fingertip Fa, a first knuckle Fb, a second knuckle Fc, and a third knuckle Fd. The plurality of locations of the index finger F2, from top to bottom, include a second fingertip Fe, a fourth knuckle Ff, a fifth knuckle Fg, and a sixth knuckle Fh. The plurality of locations of the middle finger F3, from top to bottom, include a third fingertip Fi, a seventh knuckle Fj, an eighth knuckle Fk, and a ninth knuckle Fl. The plurality of locations of the ring finger F4, from top to bottom, include a fourth fingertip Fm, a tenth knuckle Fn, an eleventh knuckle Fo, and a twelfth Fp. The plurality of locations of the little finger F5, from top to bottom, include a fifth fingertip Fq, a thirteenth knuckle Fr, a fourteenth knuckle Fs, and a fifteenth knuckle Ft.

In some embodiments, in the step S3, the gesture recognition unit 3 determines whether a curvature angle of the fifth knuckle Fg is less than a preset threshold value and determines whether a curvature angle of the eighth knuckle Fk is less than the preset threshold value. When the curvature angle of the fifth knuckle Fg is less than the preset threshold value and the curvature angle of the eighth knuckle Fk is less than the preset threshold value, the gesture recognition unit 3 determines that the hand image is a valid gesture. On the contrary, when the curvature angle of the fifth knuckle Fg is greater than or equal to the preset threshold value and the curvature angle of the eighth knuckle Fk is greater than or equal to the preset threshold value, the index finger F2 and the middle finger F3 of the palm are over bent so that the gesture recognition unit 3 determines that the hand image is not a valid gesture.

In some embodiments, in the step S5, the gesture recognition unit 3 determines the orientation of the palm according to a relative position of the index finger F2 and the middle finger F3.

The orientation of the palm may be oblique, not being upward, downward, leftward, or rightward completely. Accordingly, in some embodiments, in the step S5, the gesture recognition unit 3 selects one of the second fingertip Fe, the fourth knuckle Ff, the fifth knuckle Fg, and the sixth knuckle Fh of the index finger F2 as a first selection point. In addition, the gesture recognition unit 3 selects one of the third fingertip Fi, the seventh knuckle Fj, the eighth knuckle Fk, and the ninth knuckle Fl of the middle finger F3 as a second selection point. The location of the first selection point on the index finger F2 is corresponding to the location of the second selection point of the middle finger F3. For example, when the first selection point is the second fingertip Fe, the second selection point is the third fingertip Fi corresponding to the second fingertip Fe. The gesture recognition unit 3 subtracts an X-axis coordinate value in the coordinate information corresponding to the first selection point and an X-axis coordinate value in the coordinate information corresponding to the second selection point to obtain a deviation value of X-axis coordinate. The gesture recognition unit 3 subtracts a Y-axis coordinate value in the coordinate information corresponding to the first selection point and a Y-axis coordinate value in the coordinate information corresponding to the second selection point to obtain a deviation value of Y-axis coordinate. In addition, the gesture recognition unit 3 determines the orientation of the palm according to the deviation value of X-axis coordinate and the deviation value of Y-axis coordinate.

In some embodiments, in the step S5, when the deviation value of X-axis coordinate is a positive value, and an absolute value of the deviation value of X-axis coordinate is greater than an absolute value of the deviation value of Y-axis coordinate, the gesture recognition unit 3 determines that the orientation of the palm is upward. When the deviation value of X-axis coordinate is a negative value, and an absolute value of the deviation value of X-axis coordinate is greater than an absolute value of the deviation value of Y-axis coordinate, the gesture recognition unit 3 determines that the orientation of the palm is downward. When the deviation value of Y-axis coordinate is a positive value, and an absolute value of the deviation value of Y-axis coordinate is greater than an absolute value of the deviation value of X-axis coordinate, the gesture recognition unit 3 determines that the orientation of the palm is leftward. When the deviation value of Y-axis coordinate is a negative value, and an absolute value of the deviation value of Y-axis coordinate is greater than an absolute value of the deviation value of X-axis coordinate, the gesture recognition unit 3 determines that the orientation of the palm is rightward.

Please refer to FIG. 4, which is a flowchart illustrating sub-steps of the step S6 shown in FIG. 1. In some embodiments, the step S6 further includes following sub-steps.

Step S60: the gesture recognition unit 3 utilizes a coordinate information corresponding to the sixth knuckle Fh of the index finger F2 and a coordinate information corresponding to the fifteenth knuckle Ft of the little finger F5 to calculate a distance between the sixth knuckle Fh and the fifteenth knuckle Ft so as to obtain a width of the palm.

Step S61: the gesture recognition unit 3 utilizes a product of the width of the palm and a preset adjustable multiple to calculate a dynamic displacement threshold. The preset adjustable multiple is not a fixed value, and is adjusted according to the practical requirements.

Figure 5A:
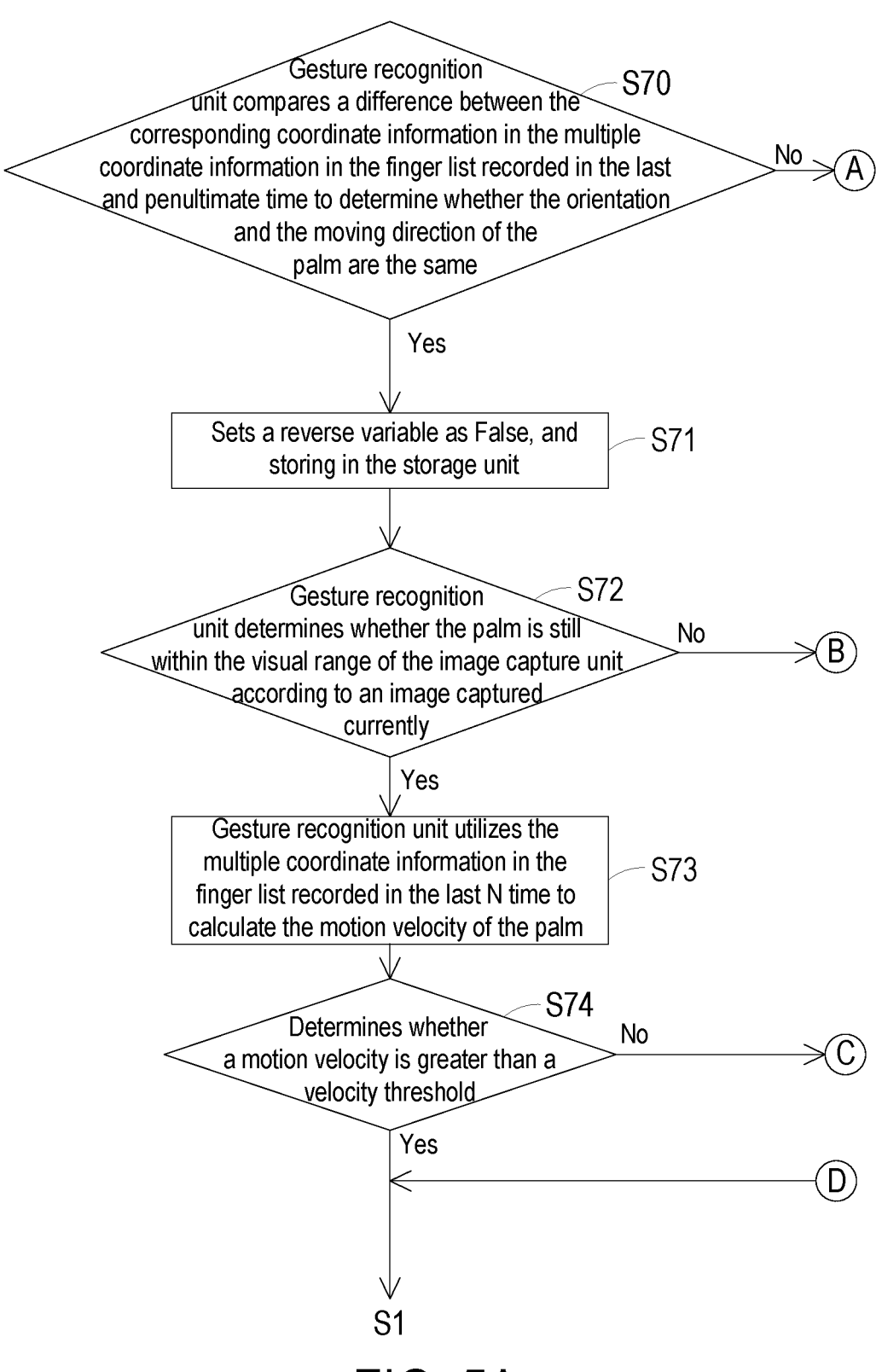
FIGS. 5A and 5B are a flowchart illustrating the determination condition in the step S7 shown in FIG. 1.
Figure 5B:
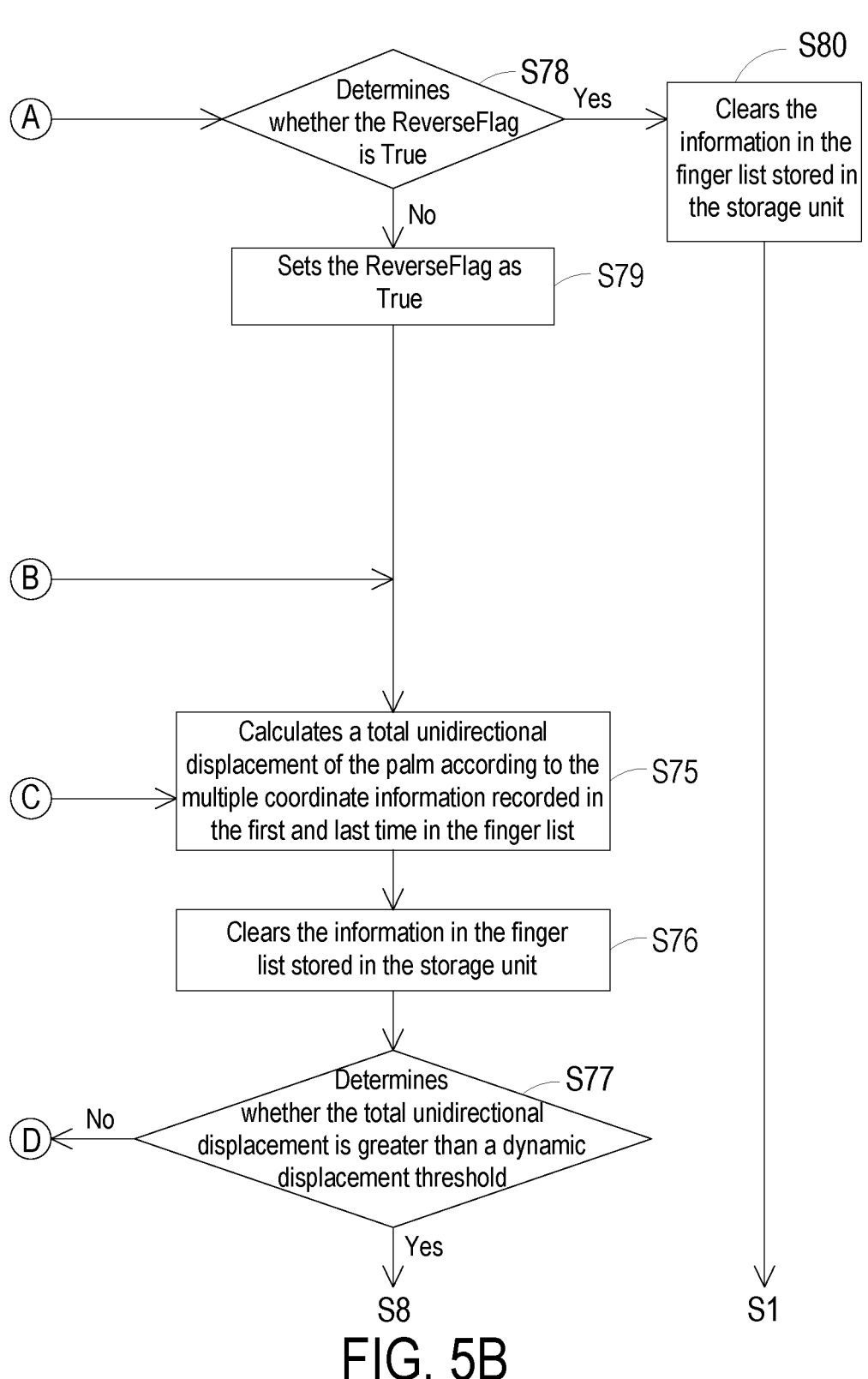

Please refer to FIG. 5, which is a flowchart illustrating the determination conditions in the step S7 shown in FIG. 1. In some embodiments, the determination conditions in the step S7 includes following steps.

Step S70: the gesture recognition unit 3 obtains a difference by comparing between the corresponding coordinate information in the plurality of coordinate information in the finger list being recorded in the last time and in the penultimate time, so as to determine whether the orientation of the palm and the moving direction of the palm are the same. In the step S70, the moving direction of the palm is calculated by utilizing a difference between one coordinate information of the plurality of coordinate information in the finger list record in the last time and a corresponding coordinate information of the plurality of coordinate information in the finger list record in the penultimate time.

Step S71: when a determination result of the step S70 is satisfied, a reverse variable (ReverseFlag) is set as False, and stored in the storage unit 4.

Step S72: the gesture recognition unit 3 determines whether the palm is still within the visual range of the image capture unit 2 according to an image frame captured by the image capture unit 2 currently.

Step S73: when the determination result of the step S72 is satisfied, the gesture recognition unit 3 utilizes the plurality of coordinate information and a time difference obtained in the time information in the finger list recorded in the last N time to calculate the velocity of the motion of the palm, wherein N is a positive integer greater than 2, and N corresponds to the image frames per second being captured by the image capture unit.

Step S74: whether a velocity of motion of the palm is greater than a velocity threshold is determined. When the determination result is satisfied, the action of the gesture has not been completed so that the step S1 is re-executed.

In some embodiments, the determination condition of the step S7 further includes the following steps.

Step S75: when the determination result of the step S72 is not satisfied (i.e., the palm leaves the visual range of the image capture unit 2) or the determination result of the step S74 is not satisfied (i.e., the velocity of the motion of the palm is less than the velocity threshold), a total unidirectional displacement of the palm is calculated according to the plurality of coordinate information record in the first time and the last time in the finger list. In some embodiments, the total unidirectional displacement of the palm is calculated according to a coordinate of a specific dimension such as X-axis coordinate or the Y-axis coordinate in the plurality of coordinate information recorded in the first time and the last time.

Step S76: clearing the information in the finger list stored in the storage unit 4. In the step S76, the plurality of coordinate information recorded in any time in the finger list is clear.

Step S77: whether the total unidirectional displacement is greater than a dynamic displacement threshold is determined. When the determination result is satisfied, the step S8 is executed. When the determination result is not satisfied, the step S1 is re-executed.

In some embodiments, the determination conditions of the step S7 further include the following steps.

Step S78: whether the ReverseFlag is True is determined.

Step S79: when the determination result of the step S78 is not satisfied, the ReverseFlag is set to be True, and the step S75 is executed.

Step S80: when the determination result of the step S78 is satisfied, the information in the finger list stored in the storage unit 4 is cleared, and the step S1 is re-executed.

Through the process and steps in the determination conditions of the step S7, there are three situations to execute the step S8, as illustrating following. The first situation is that a pause appeared in the motion process of the palm of the user, but the velocity of the motion of the palm is greater than a velocity threshold, and the total unidirectional displacement is greater than the dynamic displacement threshold. The second situation is that the palm of the user exceeds the visual range of the image capture unit 2, but the velocity of the motion of the palm is greater than the velocity threshold, and the total unidirectional displacement is greater than the dynamic displacement threshold as well. The third situation is that the palm of the user begins to move reversely from moving forwardly, and the total unidirectional displacement is greater than the dynamic displacement threshold.

In summary, the present disclosure provides a gesture recognition method for a mobile device. The gesture recognition method of the present disclosure is performed to determine the orientation of the palm and calculate the dynamic displacement threshold according to the width of the palm. Furthermore, whether to launch an action command is determined according to the orientation of the palm, the dynamic displacement threshold and the determination conditions. Consequently, the gesture recognition of the mobile device is more precise. In addition, the gesture recognition method of the present disclosure does not utilize a fix displacement threshold of the gesture to determine whether a user has completed an action, but considers whether the orientation of the palm and the moving direction of the palm are the same and whether the velocity of the motion of the palm is greater than a velocity threshold. Consequently, misjudgment of the gesture is prevented from being occurred. Furthermore, when the palm of the user moves out of the visual range of the image capture unit of the mobile device, the gesture recognition method of the present disclosure is still able to determine whether the action of the gesture has completed according to the velocity of motion and the total unidirectional displacement of the palm so as to avoid neglecting the gesture of the user. Consequently, the mobile device can be controlled by the user precisely.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gesture recognition method for a mobile device, wherein the mobile device comprises an image capture unit, a gesture recognition unit, and a storage device, and the gesture recognition method comprises steps of:

(S1) capturing an image frame within a current visual range by the image capture unit;

(S2) determining whether the image frame captured by the image capture unit includes a hand image with a palm by the gesture recognition unit;

(S3) when a determination result of the step (S2) is satisfied, the gesture recognition unit determining whether the hand image is a valid gesture;

(S4) when a determination result of the step (S3) is satisfied, the gesture recognition unit recording a plurality of coordinate information of a plurality of locations corresponding to a plurality of fingers of the palm shown in the hand image in a finger list, and storing the finger list in the storage unit;

(S5) the gesture recognition unit obtaining an orientation of the palm according to the hand image;

(S6) the gesture recognition unit calculating a width of the palm according to the hand image, and calculating a dynamic displacement threshold according to the width of the palm;

(S7) the gesture recognition unit determining whether to launch an action command according to the dynamic displacement threshold and at least one determination condition, and when a determination result of the step (S7) is not satisfied, re-executing the step (S1);

(S8) when the determination result of the step (S7) is satisfied, launching the action command, and re-executing the step (S1); and (S9) when the determination result of the step (S2) is not satisfied or when the determination result of the step (S3) is not satisfied, determining whether the record of the plurality of coordinate information in the finger list is empty, and re-executing the step (S1) when a determination result of the step (S9) is satisfied, and executing the step (S7) when the determination result of the step (S9) is not satisfied;

wherein the gesture recognition unit determines whether to launch an action command according to the orientation of the palm, the dynamic displacement threshold and at least one determination condition, wherein the at least one determination condition in the step (S7) comprises steps of:

(S70) the gesture recognition unit obtaining a difference by comparing between the corresponding coordinate information in the plurality of coordinate information in the finger list being recorded in the last time and in the penultimate time so as to determine whether the orientation of the palm and a moving direction of the palm are the same;

(S71) when a determination result of the step (S70) is satisfied, a reverse variable is set as false and stored in the storage unit;

(S72) the gesture recognition unit determining whether the palm is still within a visual range of the image capture unit according to the image frame captured by the image capture unit currently;

(S73) when a determination result of the step (S72) is satisfied, the gesture recognition unit utilizing the plurality of coordinate information and a time difference obtained in a time information of the plurality of locations in the finger list recorded in the last N time to calculate the velocity of the motion of the palm, wherein N is a positive integer greater than 2, and N corresponds to the image frames per second being captured by the image capture unit; and (S74) determining whether the velocity of the motion of the palm is greater than a velocity threshold, and when a determination result is satisfied, re-execute the step (S1).

2. The gesture recognition method according to claim 1, wherein the gesture recognition unit recognizes that the plurality of fingers comprise a thumb, an index finger, a middle finger, a ring finger, a little finger, and a wrist end, wherein the plurality of locations of the thumb, from top to bottom, comprising a first fingertip, a first knuckle, a second knuckle, and a third knuckle; the plurality of locations of the index finger, from top to bottom, comprising a second fingertip, a fourth knuckle, a fifth knuckle, and a sixth knuckle; the plurality of locations of the middle finger, from top to bottom, comprising a third fingertip, a seventh knuckle, an eighth knuckle, and a ninth knuckle; the plurality of locations of the ring finger, from top to bottom, comprising a fourth fingertip, a tenth knuckle, an eleventh knuckle, and a twelfth knuckle; and the plurality of locations of the little finger, from top to bottom, comprising a fifth fingertip, a thirteenth knuckle, a fourteenth knuckle, and a fifteenth knuckle.

3. The gesture recognition method according to claim 2, wherein in the step (S3), the gesture recognition unit determines whether a curvature angle of the fifth knuckle is less than a preset threshold value and determines whether a curvature angle of the eighth knuckle is less than the preset threshold value, wherein when the curvature angle of the fifth knuckle is less than the preset threshold value and the curvature angle of the eighth knuckle is less than the preset threshold value, the gesture recognition unit determines that the hand image is a valid gesture, wherein when the curvature angle of the fifth knuckle is greater than or equal to the preset threshold value and the curvature angle of the eighth knuckle is greater than or equal to the preset threshold value, the gesture recognition unit determines that the hand image is not a valid gesture.

4. The gesture recognition method according to claim 2, wherein in the step (S5), the gesture recognition unit determines the orientation of the palm according to a relative position of the index finger and the middle finger.

5. The gesture recognition method according to claim 4, wherein in the step (S5), the gesture recognition unit selects one of the second fingertip, the fourth knuckle, the fifth knuckle, and the sixth knuckle of the index finger as a first selection point; the gesture recognition unit selects one of the third fingertip, the seventh knuckle, the eighth knuckle, and the ninth knuckle of the middle finger as a second selection point; and the location of the first selection point on the index finger is corresponding to the location of the second selection point of the middle finger, wherein the gesture recognition unit subtracts an X-axis coordinate value in the coordinate information corresponding to the first selection point and an X-axis coordinate value in the coordinate information corresponding to the second selection point to obtain a deviation value of X-axis coordinate; the gesture recognition unit subtracts a Y-axis coordinate value in the coordinate information corresponding to the first selection point and a Y-axis coordinate value in the coordinate information corresponding to the second selection point to obtain a deviation value of Y-axis coordinate; and the gesture recognition unit determines the orientation of the palm according to the deviation value of X-axis coordinate and the deviation value of Y-axis coordinate.

6. The gesture recognition method according to claim 5, wherein in the step (S5), when the deviation value of X-axis coordinate is a positive value, and an absolute value of the deviation value of X-axis coordinate is greater than an absolute value of the deviation value of Y-axis coordinate, the gesture recognition unit determines that the orientation of the palm is upward, wherein when the deviation value of X-axis coordinate is a negative value, and an absolute value of the deviation value of X-axis coordinate is greater than an absolute value of the deviation value of Y-axis coordinate, the gesture recognition unit determines that the orientation of the palm is downward, wherein when the deviation value of Y-axis coordinate is a positive value, and an absolute value of the deviation value of Y-axis coordinate is greater than an absolute value of the deviation value of X-axis coordinate, the gesture recognition unit determines that the orientation of the palm is leftward, wherein when the deviation value of Y-axis coordinate is a negative value, and an absolute value of the deviation value of Y-axis coordinate is greater than an absolute value of the deviation value of X-axis coordinate, the gesture recognition unit determines that the orientation of the palm is rightward.

7. The gesture recognition method according to claim 5, wherein the step (S6) further comprises sub-steps of:

(S60) the gesture recognition unit utilizing a coordinate information corresponding to the sixth knuckle of the index finger and a coordinate information corresponding to the fifteenth knuckle of the little finger to calculate a distance between the sixth knuckle and the fifteenth knuckle so as to obtain the width of the palm; and (S61) the gesture recognition unit utilizing a product of the width of the palm and a preset adjustable multiple to calculate the dynamic displacement threshold.

8. The gesture recognition method according to claim 1, wherein the determination condition in the step (S7) comprises steps of:

(S75) when a determination result of the step (S72) is not satisfied or a determination result of the step (S74) is not satisfied, calculating a total unidirectional displacement of the palm according to the plurality of coordinate information record in the first time and the last time in the finger list;

(S76) clearing the information in the finger list stored in the storage unit; and (S77) determining whether the total unidirectional displacement is greater than a dynamic displacement threshold, wherein when a determination result is satisfied, executing the step (S8) to launch the action command, and when the determination result is not satisfied, re-executing the step (S1).

9. The gesture recognition method according to claim 8, wherein the determination condition in the step (S7) comprises steps of:

(S78) determining whether the reverse variable is True;

(S79) when a determination result of the step (S78) is not satisfied, setting the reverse variable to be True, and executing the step (S75); and (S80) when the determination result of the step (S78) is satisfied, clearing the information in the finger list stored in the storage unit, and re-executing the step (S1).

\* \* \* \* \*